3,520,833
METHOD OF MAKING EXPANDABLE POLYMERS
Harold A. Wright, Murrysville, Pa., assignor to Sinclair-Koppers Company, a partnership
No Drawing. Filed Jan. 15, 1968, Ser. No. 697,601
Int. Cl. C08d *13/08;* C08f *47/10;* C08j *1/26*
U.S. Cl. 260—2.5                    4 Claims

ABSTRACT OF THE DISCLOSURE

Expandable polystyrene beads that exhibit excellent anti-lumping properties and good fusion on molding are produced by suspending polystyrene beads in an aqueous medium and impregnating a blowing agent into the beads in the presence of at least 0.05, but usually not more than 0.75 part per 100 parts of the beads of a lecithin.

BACKGROUND OF THE INVENTION

The making of low-density, cellular, shaped, plastic articles from expandable particles, granules, or beads of thermoplastic material such as styrene polymers is well known. A typical expandable particle is sold under the trademark Dylite®. Such particles generally contain a blowing agent which boils below the softening point of the thermoplastic material and which will cause the particles to expand when they are subjected to heat.

The particles are generally pre-expanded before introduction into the mold to provide better fusion and less density variation in the molded article. Such a pre-expansion can be readily carried out as, for example, described in United States Pat. No. 3,023,175.

These pre-expanded particles are placed in a mold cavity which defines the shape of the desired finished article. The particles are heated above their softening point, for example, by steam or other suitable heating media injected under pressure into the mold cavity, whereupon the particles expand to fill the mold cavity and fuse together.

A resultant problem of such pre-expansion before introduction into the mold, however, is the tendency of the pre-expanded particles to clump together and form lumps which render the granules unsuitable for molding.

Such lumping or formation of clumped pre-puffs leads to serious molding problems. These lumps cannot be properly conveyed in processing plants and are unsuitable for charging into molds of intricate contour due to improper fill-out of the molded articles. Even if reasonable fill-out is achieved, variations in density of the article can result and voids also occur.

Various methods have been proposed for the prevention of lumping during pre-expansion, but these have all suffered from some objectionable feature such as rapid loss of the blowing agent, poor flow of the treated beads, dust problems which cause plugging of the steam ports, and often serious reduction in fusion of the beads on molding. As an example, U.S. 3,300,437, teaches the coating of bead surfaces with a powder containing a specific particle size of Kaolin clay in conjunction with hydroxypropylated alkylene diamine. Such a process would suffer from problems generally encountered with dusting processes and also requires a separate treating of the beads with specifically prepared mixtures.

It has now been found that, surprisingly the addition of a lecithin at the time of hard bead impregnation, i.e., the impregnation of polystyrene beads with a blowing agent in aqueous suspension, results in the production of expandable polystyrene beads which do not lump on pre-expansion and still give good fusion on molding.

Lecithin is a commercially available item, and as described in Kirk-Othmer Encyclopedia of Chemical Technology, vol. 8, page 309, (1952) is a phosphorous-containing lipide, that is, true chemical lecithin is a phosphatide consisting of glycerol combined with two fatty acid radicals, phosphoric acid and choline.

SUMMARY OF THE INVENTION

In accordance with the invention, vinyl aromatic polymers are impregnated with blowing agents in the presence of 0.05–0.75 part per 100 parts of polymer of a lecithin. The use of the lecithin within these limits produces a pre-puff which does not lump together and such lecithin does not interfere with fusion of the beads on molding.

DETAILED DESCRIPTION

The process of the invention adds at the time of hard bead impregnation, a commercially available lecithin. Generally, the lecithin is obtained by adding water or steam to crude soybean oil. Precipitation results to give a sludge which is then separated and dried to give commercial lecithin. The soybean oil present in such mixtures can be replaced by suitable diluents, but the main constituent remains as phosphatides.

Various suitable lecithins include the whole phosphatides, the hydroxylated lecithins, the cephalin and inositol phosphatides, the alcohol-soluble phosphatides, and the like. Examples of such lecithins are described in U.S. 3,357,918 and in other available art.

The styrene polymers can, of course, be produced by various conventional bead polymerization techniques.

The amount of lecithin added must be added in amounts between about 0.05 and 0.75 part by weight per 100 parts of polymer. The amount within this range will vary depending on the specific lecithin used, whether whole phosphatides, alcohol-soluble portions and the like, but should be kept within the above range. Lesser amounts will not give adequate non-lumping properties while greater than about 0.75 part serve no useful purpose and would interfere with other properties of the beads.

The lecithin compound is added to the polystyrene particles after the particles have been completely polymerized (i.e., as a hard bead impregnation). Addition of lecithin prior to substantially complete polymerization can result in upsetting the delicate balance needed for the polymerization reaction and would result in interference with the reaction. In the process, the addition of the lecithin is carried out by adding the lecithin to the aqueous suspension in which the particles were prepared or, alternatively, the particles can be separated from the aqueous suspension, for example, in order to remove any off-size particles by screening prior to impregnation with blowing agent, and then resuspended in an aqueous medium.

Where the particles are suspended, suspending agents are added to the water to keep the particles from agglomerating at the elevated temperatures employed during the impregnation process. Suitable suspending agent systems are, for example, those described in D'Alelio Pat. 2,983,692, such as tri-calcium phosphate in combination with an anionic surface active agent.

The impregnation is conventionally carried out at temperatures ranging from about 80° to 150° C. Increasing the temperatures makes the impregnation proceed at a faster rate.

The blowing agents are compounds which are gases or which will produce gases on heating. Preferred blowing agents include aliphatic hydrocarbons containing from 1–7 carbon atoms in the molecule, for example, methane, ethane, propane, butane, pentane, hexane, heptane, cyclohexane, and their halogenated derivatives which boil at a temperature below the softening point of the polymer.

In accordance with this invention, a variety of expandable thermoplastic homopolymers and copolymers can be prepared which are derived from vinyl aromatic monomers including styrene, divinylbenzene, vinyl toluene, isopropylstyrene, alpha-methylstyrene, nuclear dimethylstyrenes, chlorostyrene, vinylnaphthalene, etc., as well as polymers prepared by the copolymerization of a vinyl aromatic monomer with monomers such as butadiene, alkyl methacrylates, alkyl acrylates, and acrylonitrile wherein the vinyl aromatic monomer is present in at least 50% by weight. For the purposes of convenience, these polymers are referred to herein as styrene polymers.

The invention is further illustrated by the following examples wherein parts are parts by weight unless otherwise indicated.

EXAMPLE I

To a 100 gallon stirred reactor, there was charged in sequence 100 parts of water, 0.01 part Nacconol 90–F (sodium dodecyl benzene sulfonate), 1.0 part tricalcium phosphate, and 100 parts of Dylene 8 polystyrene (a commercial brand of polystyrene) beads. One half (50 parts) of the beads had a particle size of predominantly through 16, and on 25 mesh and the other half (50 parts) had a particle size of through 25 and on 45 mesh U.S. Standard Sieve. There was then added a solution of 0.10 part Centrophil S.G. (lecithin in propylene glycol, 60% solids:alcohol-soluble phosphatides) in 8.0 parts n-pentane. The mass was stirred at 110 r.p.m. and heated during 90 min. to 90° C. The mixture was then stirred at 90° C. (86 p.s.i.g.) for 160 min., the temperature raised to 110° C. during 65 min. and stirring continued at 110° C. (105 p.s.i.g.) for 120 min. The suspension was cooled to room temperature and acidified to a pH of 1.5 with HCl. The beads were separated from the aqueous phase by centrifuge, washed with water and air dried at room temperature. An aliquot of the beads were pre-expanded in a Rodman Pre-expander (U.S. 3,023,175) to a density of 1.26 p.c.f. The beads exhibited excellent anti-lump qualities with only about 1–2% lumps being formed. Polystyrene beads of the type used above without the addition of lecithin pre-expanded to the same density, but provided an excessive amount (>8%) of lumps.

Portions of the beads so pre-expanded were steam molded by conventional procedures, to produce blocks having (75–80% fusion) of the beads, evidencing that the lecithin does not interfere with fusion.

EXAMPLE II

To a reactor, there was charged in the following sequence: 100 parts of water, 0.05 part Nacconol 90–F (sodium dodecyl benzene sulfonate) 3.0 parts tricalcium phosphate, 0.5 part Centromix C (granules: whole phosphatides, dusted with 2% tricalcium phosphate), 100 parts of Dylene 8 polystyrene (a commercial brand of polystyrene) beads having a particle size of predominantly through 25 and on 45 mesh U.S. Standard Sieve, and 7.6 parts n-pentane. The mixture was stirred and heated during 1.5 hours to 110° C. and maintained at 110° C. for 4 hours. The suspension was cooled to room temperature and acidified to a pH of 1.4 with HCl. The beads were separated from the aqueous phase by centrifuge, washed with water and air dried at room temperature. Fifteen parts of the impregnated beads were supported on a 100-mesh screen and heated for two minutes in the presence of steam generated at atmospheric pressure by boiling water below the screen. This pre-expander was constructed as described by A. R. Ingram and H. A. Wright, Modern Plastics, 41, 152, November 1963. The beads were then lightly crushed by hand and sieve through a 4-mesh screen. The amount of lumped particles on the screen was reported as percent lumps. This method generally gives larger amounts of pre-puff lumping in the order of 20–50%, than does the controlled commercial pre-expanders, but provides a relative value when used with a control sample. The above-described beads containing Centromix C gave 0% lumps. Blocks formed from the beads showed that there was no interference with fusion of the beads containing the Centromix C.

EXAMPLE III

The procedure of Example II was repeated except that the Centromix C was omitted. The resultant beads showed 55.3% lumps after pre-expansion.

EXAMPLE IV

The procedure of Example II was repeated in two experiments, except that a different lecithin was substituted in place of Centromix C. In one experiment, Centroflex F (whole phosphatides:powder) was used and in the other, Centrolene S (hydroxylated lecithin: jelly, 60% in vegetable oil) was used. Both experiments produced beads having 0% lumping on pre-expansion and there was no interference with fusion on molding.

EXAMPLE V

A series of experiments were made following the procedure of Example II, but varying the type and amount of lecithin used. The results are listed in Table I.

TABLE I

| Experiment | Lecithin additive | Wt. percent | Percent lumps on pre-expansion |
|---|---|---|---|
| 1 (control) | | 0 | 26.7 |
| 2 | Controlex C | 0.25 | 0.0 |
| 3 | do | 0.10 | 2.6 |
| 4 | do | 0.05 | 0.0 |
| 5 | Centrolex F | 0.25 | 0.0 |
| 6 | do | 0.10 | 0.0 |
| 7 | do | 0.05 | 2.6 |
| 8 | do | 0.01 | 18.7 |
| 9 | Centrolex P (whole phosphatides) | 0.25 | 0.0 |
| 10 | do | 0.10 | 3.4 |
| 11 | do | 0.05 | 0.0 |
| 12 | do | 0.01 | 9.4 |
| 13 | Centrolene S (hydroxylated) lecithin) | 0.25 | 0.0 |
| 14 | do | 0.10 | 6.0 |
| 15 | do | 0.05 | 0.0 |
| 16 | Centrophil SG | 0.25 | 0.0 |
| 17 | do | 0.10 | 0.0 |
| 18 | do | 0.05 | 6.7 |

The percentage fusion in the preceding examples was calculated by determining the amount of beads, in a ten-by-ten bead square of the foamed article, which had torn areas and the number of beads in the same area which separated from adjoining beads at the bead-to-bead boundry without tearing. The number of torn beads divided by the total bead, times 100, then gives the percentage fusion.

There has been described a method of producing expandable styrene beads which do not lump together on pre-expansion and which exhibit good fusion on molding the beads to form an expanded article.

What is claimed is:

1. A process for making expandable styrene polymer particles having excellent anti-lumping properties on pre-expansion comprising suspending said particle in an aqueous medium containing lecithin and impregnating a blowing agent into said particles in said aqueous medium, said lecithin being present in an amount of 0.05 to 0.75 part per 100 parts of said polymer particles.

2. The process of claim 1 wherein the blowing agent is an aliphatic hydrocarbon containing from 1–7 carbon atoms in the molecule which boils below the softening point of the polymer.

3. The process of claim 1 wherein said lecithin is comprised of whole phosphatides.

4. The process of claim 1 wherein said lecithin comprises alcohol-soluble phosphatides.

(References on following page)

References Cited

UNITED STATES PATENTS 3,385,804  5/1968  Hill.
3,389,097  6/1968  Ingram et al.
3,429,737  2/1969  Marsden.

MURRAY TILLMAN, Primary Examiner
M. FOELAK, Assistant Examiner

U.S. Cl. X.R.

260—93.5